Patented Nov. 24, 1953

2,660,561

UNITED STATES PATENT OFFICE 2,660,561

METHOD OF TREATING DRILLING FLUIDS TO REDUCE WATER LOSSES

Thomas E. Watkins, Dallas, Tex., assignor, by mesne assignments, to Socony-Vacuum Oil Company, Incorporated, New York, N. Y., a corporation of New York No Drawing. Application August 28, 1950, Serial No. 181,913

16 Claims. (Cl. 252—8.5)

This invention relates to drilling fluids and relates more particularly to the treatment of drilling fluids to reduce water loss.

In the rotary drilling of oil and gas wells, a drilling fluid is employed for the purposes of lubricating the drill bit, carrying cuttings to the surface, and imposing a hydrostatic pressure to prevent flow of fluid from the drilled formations into the bore hole. As the bore hole is drilled through porous formations, difficulty is encountered as a result of loss of water from the drilling fluid into the formations by filtration through the mud sheath formed from the drilling fluid on the wall of the bore hole. It is highly desirable to maintain this loss of water by filtration, or water loss as it is commonly termed, as low as possible in order not only to prevent changes in the viscosity and other properties of the drilling fluid but also to prevent clogging of the formation where the formation is productive of oil or gas. Various agents have been added to aqueous drilling fluids to impart a low water loss to the drilling fluid, and karaya gum has been found, in connection with ordinary aqueous drilling fluids, to be an effective and even superior agent. The addition of water loss reducing agents to aqueous drilling fluids usually results in an increase in the viscosity and gel strength of the drilling fluids. In common with other water loss reducing agents, karaya gum increases the viscosity and gel strength of the drilling fluids but the increase is, initially, greater than the increase encountered with more commonly used agents even though with aging the viscosity and gel strength decrease to levels attained with other agents. Thus, while karaya gum is an effective and even superior agent, its greater initial effect on the viscosity and gel strength of the drilling fluid discourages its more extensive use.

It is an object of this invention to reduce water loss properties of aqueous drilling fluids. It is another object of this invention to reduce the increase in viscosity and gel strength of aqueous drilling fluid upon addition thereto of karaya gum. It is another object of this invention to provide a method for treating karaya gum to improve its usefulness as a water loss reducing agent in aqueous drilling fluid. Further objects of the invention will become apparent from the following description thereof.

In accordance with the invention, an aqueous drilling fluid is treated to reduce water loss by adding thereto karaya gum which has been previously heated in the dry state at a temperature of at least about 90° C. and for a time not less than about that given by the expression $$T = 28 - .2t$$

where T is the time in hours and t is the temperature in degrees centigrade.

I have found that by heating karaya gum at a temperature of at least about 90° C. and for a time not less than about that given by the expression $T = 28 - .2t$ and thereafter adding to an aqueous drilling fluid, the initial increase in viscosity and gel strength of the drilling fluid ordinarily encountered is reduced well below that encountered employing untreated karaya gum and is reduced to below that encountered with starch, a commonly used water loss reducing agent. Further, I have found that the heat treatment of the karaya gum, if not conducted at an excessively high temperature, does not greatly affect the water loss reducing properties of the karaya gum. By the process of the invention therefore, the advantages of employing karaya gum for improving the water loss properties of aqueous drilling fluids may be obtained without the disadvantages of high initial increases in viscosity and gel strength.

In the practice of the invention, the karaya gum is heated in the dry state at a temperature of at least about 90° C. At this temperature, the time of heating should be not less than about ten hours. The karaya gum may be heated at higher temperatures in which case the time of heating may be reduced in accordance with the expression $T = 28 - .2t$. Thus, where the temperature of heating is 100° C., the time of heating should be not less than about eight hours. The expression $T = 28 - .2t$ indicates the minimum time of heating only and, if desired, the heating may be carried out for longer times than indicated by the expression. Preferably, the temperature of heating should not be in excess of about 100° C., since above 100° C. karaya gum tends to carbonize.

The heating of the karaya gum may be carried out by any suitable procedure. For example, the karaya gum may be heated in an oven, by passing hot gases over the gum, by heat lamps, etc. The method of heating employed, however, should be such that local overheating to temperatures above about 100° C. is avoided. The heating of the karaya gum must be carried out with the gum in the dry state since heating of the gum while in the form of a solution or suspension in a liquid medium does not produce the effect of reducing the increase in viscosity and gel strength of the drilling fluid.

Preferably, the heating of the karaya gum is carried out just prior to adding the gum to the drilling fluid. However, it is not essential that the gum be heated just prior to adding to the drilling fluid. Rather, the gum may be added to the drilling fluid a considerable period of time after the heating treatment. Thus, where the gum, after the heating treatment, is stored in a dry atmosphere, it will preserve its effectiveness for months.

The amount of heated karaya gum to be added to any drilling fluid to reduce water loss will depend upon the extent to which the water loss is to be reduced and upon the composition of the drilling fluid not only with respect to the ingredients added thereto but also the contaminants picked up during drilling. Generally, amounts between 0.1 pound per barrel and four pounds per barrel will effectively reduce water loss. However, the proper amount to be added to any drilling fluid to obtain a desired reduction in water loss may be determined by addition of varying amounts to samples of the drilling fluid and determining the water loss properties of the samples by conventional testing methods.

A particular feature of the invention resides in the treatment of calcium base drilling fluids. Ordinary aqueous drilling fluids comprise an aqueous suspension of a clay, such as bentonite, which imparts thixotropic properties to the suspension. To the suspension may be added weighting agents such as barites, various additives to control the viscosity and gel strength of the fluid, such as tannates, etc., and other additives for particular purposes. In these drilling fluids, karaya gum has been employed to reduce water loss. Calcium base drilling fluids comprise essentially an aqueous suspension of a clay, such as bentonite, which imparts thixotropic properties to the suspension, and a calcium compound, such as calcium hydroxide, in such amounts as to provide an excess of calcium ions necessary to combine with the anion of the clay and prevent rise in viscosity of the suspension upon further addition of a calcium compound greater than the rise that would occur upon addition of the same amounts of an inert solid material. Weighting agents and various additives may be used in these drilling fluids. Calcium base drilling fluids are usually employed where the drilling fluid will become contaminated with cement during the drilling operations, to prevent heaving of shale, and to prevent viscosity increase of the fluid arising from admixture with bentonite picked up from the formations being drilled.

Commonly, reduction of water loss of calcium base drilling fluids is effected by adding starch to the drilling fluid. The addition of karaya gum to calcium base drilling fluids, however, results in greater reduction of water loss than the addition of the same amounts of starch. This is illustrated in the following example.

EXAMPLE I

To a portion of a calcium base drilling fluid consisting of water and the following components in the amounts indicated:

|  | Pounds per barrel of drilling fluid |
|---|---|
| Calcium hydroxide | 8 |
| Sodium chloride | 18 |
| Sodium hydroxide | 1 |
| Quebracho | 1 |
| Bentonite | 30 |
| Calcium montmorillonite | 65 | were added two pounds per barrel of starch. The water loss of this fluid after aging at 170° F. for 40 hours was 31 cc. (A. P. I. 30 minute water loss). Two pounds per barrel of karaya gum were added to another portion of this fluid and the water loss after aging at 170° F. for 40 hours was 14 cc., a reduction of 17 cc.

While, as indicated above, the addition of karaya gum to an aqueous drilling fluid effectively reduces the water loss of the fluid, the addition of untreated karaya gum results in an initial increase in viscosity and gel strength of the fluid. Thus, the addition of the untreated karaya gum to the calcium base drilling fluid above resulted in an initial viscosity of 153 centipoises (Stormer 600 R. P. M. viscosity) and a ten-minute gel strength of 80 grams. At the end of 66 hours of aging at 170° F., the viscosity decreased to 70 centipoises and the 10-minute gel strength decreased to 14 grams. As compared to this, the addition of two pounds per barrel of starch increased the viscosity initially to 60 centipoises and the gel strength to 40 grams. After 66 hours of aging at 170° F., the viscosity had increased to 70 centipoises (the same viscosity as attained after 66 hours by the drilling fluid treated with karaya gum) and the gel strength had decreased to 36 grams.

By the process of the invention, the viscosity and gel strength of aqueous drilling fluid are reduced, and are reduced to values below those attained using starch. This will be illustrated in Examples II and III following.

EXAMPLE II

A calcium base drilling fluid was prepared consisting of water and the following components in the amounts indicated:

|  | Pounds per barrel of drilling fluid |
|---|---|
| Calcium hydroxide | 8 |
| Sodium chloride | 18 |
| Sodium hydroxide | 1 |
| Quebracho | 1 |
| Bentonite | 30 |
| Calcium montmorillonite | 64 |

The viscosity and water loss of this fluid were determined on a portion thereof following aging at 170° F. for 40 hours. To other portions were added one pound per barrel of unheated karaya gum, and one pound per barrel of karaya gum which had been heated in the dry state for 16 hours at 100° C. The treated portions of the fluid were aged at 170° F. for 16 hours and the viscosity and water loss determined. The table gives the results obtained.

Table I

| Treating Agent | Viscosity, Centipoises (Stormer 600 R. P. M. Viscosity) | Water Loss, cc. (API 30 Minute Water Loss) |
|---|---|---|
| None | 40 | 97 |
| Karaya Gum (unheated) | 102 | 30 |
| Karaya Gum (heated) | 62 | 37 |

It will be observed from the table that whereas the untreated karaya gum markedly reduced the water loss of the drilling fluid, it caused a large increase in viscosity. On the other hand, the heated karaya gum caused only a moderate increase in the viscosity of the drilling fluid yet comparably reduced the water loss.

EXAMPLE III

A calcium base drilling fluid was prepared consisting of water and the following components in the amounts indicated:

| | Pounds per barrel of drilling fluid |
|---|---|
| Calcium hydroxide | 8 |
| Sodium chloride | 18 |
| Sodium hydroxide | 2 |
| Quebracho | 2 |
| Bentonite | 30 |
| Salt water clay | 65 |

The drilling fluid was aged at 170° F. for 40 hours. Two pounds per barrel of starch and two pounds per barrel of karaya gum that had been heated in the dry state for 66 hours at 100° C. were thereafter added respectively to separate portions of the drilling fluid. The water loss and viscosity of the treated portions of the drilling fluid were measured initially and after aging for 16 hours at 170° F. The table gives the results obtained.

*Table II*

| Treating agent | Viscosity, centipoises (Stormer 600 R. P. M. viscosity) | | Waterloss, cc. (API 30 minute water loss) | |
|---|---|---|---|---|
| | Initially | After aging | Initially | After aging |
| Starch | 117 | 140 | 75 | 88 |
| Karaya gum | 90 | 45 | 23 | 24 |

It will be observed from the table that in the amount of two pounds per barrel of treating agent, heated karaya gum resulted in a greater decrease in water loss than starch and, further, that the viscosity of the drilling fluid treated with heated karaya gum was lower both initially and after aging than that of the drilling fluid treated with starch.

Having thus described my invention, it will be understood that such description has been given by way of illustration and example and not by way of limitation, reference for the latter purpose being had to the appended claims.

I claim:

1. A method of treating an aqueous drilling fluid to reduce the water loss of said drilling fluid comprising adding thereto karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade.

2. A method of treating an aqueous calcium base drilling fluid to reduce the water loss of said drilling fluid comprising adding thereto karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade.

3. A method of treating an aqueous drilling fluid to reduce the water loss of said drilling fluid comprising adding thereto in an amount of at least 0.1 pound per barrel karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade.

4. A method of treating an aqueous calcium base drilling fluid to reduce the water loss of said drilling fluid comprising adding thereto in an amount of at least 0.1 pound per barrel karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade.

5. A method of treating an aqueous drilling fluid to reduce the water loss of said drilling fluid comprising adding thereto in an amount between about 0.1 pound and 4 pounds per barrel karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade.

6. A method of treating an aqueous calcium base drilling fluid to reduce the water loss of said drilling fluid comprising adding thereto in an amount between about 0.1 pound and 4 pounds per barrel karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade.

7. A drilling fluid comprising an aqueous suspension of a clay which imparts thixotropic properties to the suspension and containing karaya gum which has been heated in the dry state at a temperature of at least about 90° C. but not above about 100° C. and for a time not less than about that given by the expression $T=28-.2t$, where T is the time in hours and $t$ is the temperature in degrees centigrade.

8. A drilling fluid comprising an aqueous suspension of a clay which imparts thixotropic properties to the suspension, a calcium compound in an amount in excess of that required to provide sufficient calcium ions to react with the anions of the clay, and karaya gum which has been heated in the dry state at a temperature of at least about 90° C. but not above about 100° C. and for a time not less than about that given by the expression $T=28-.2t$, where T is the time in hours and $t$ is the temperature in degrees centigrade.

9. A drilling fluid comprising an aqueous suspension of a clay which imparts thixotropic properties to the suspension and containing in an amount between about 0.1 pound and 4 pounds per barrel of said suspension karaya gum which has been heated in the dry state at a temperature of at least about 90° C. but not above about 100° C. and for a time not less than about that given by the expression $T=28-.2t$, where T is the time in hours and $t$ is the temperature in degrees centigrade.

10. A drilling fluid comprising an aqueous suspension of a clay which imparts thixotropic properties to the suspension, a calcium compound in an amount in excess of that required to provide sufficient calcium ions to react with the anions of the clay, and containing in an amount between about 0.1 pound and 4 pounds per barrel of said suspension karaya gum which has been heated in the dry state at a temperature of at least about 90° C. but not above about 100° C. and for a time not less than about that given by the expression $T=28-.2t$, where T is the time in hours and $t$ is the temperature in degrees centigrade.

11. In the drilling of a well wherein there is circulated in said well a drilling fluid comprising in admixture water and clay, the method of reducing the loss of water from the drilling fluid into the earth formations through the drilling fluid sheath formed on the walls of said well comprising adding to said drilling fluid karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade, and circulating said drilling fluid in said well.

12. In the drilling of a well wherein there is circulated in said well a drilling fluid comprising in admixture water, clay, and calcium compound in an amount in excess of that required to provide calcium ions to combine with the anion of the clay, the method of reducing the loss of water from the drilling fluid into the earth formations through the drilling fluid sheath formed on the walls of said well comprising adding to said drilling fluid karaya gum which has been previously heated in the dry state at a temperature of at least about 90° C. but not above about 100° C. and for a time not less than about that given by the expression $T=28-.2t$, where T is the time in hours and $t$ is temperature in degrees centigrade, and circulating said drilling fluid in said well.

13. In the drilling of a well wherein there is circulated in said well a drilling fluid comprising in admixture water and clay, the method of reducing the loss of water from the drilling fluid into the earth formations through the drilling fluid sheath formed on the walls of said well comprising adding to said drilling fluid in an amount of at least 0.1 pound per barrel of said drilling fluid karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade, and circulating said drilling fluid in said well.

14. In the drilling of a well wherein there is circulated in said well a drilling fluid comprising in admixture water, clay, and calcium compound in an amount in excess of that required to provide calcium ions to combine with the anion of the clay, the method of reducing the loss of water from the drilling fluid into the earth formations through the drilling fluid sheath formed on the walls of said well comprising adding to said drilling fluid in an amount of at least 0.1 pound per barrel of said drilling fluid karaya gum which has been previously heated in the dry state at a temperature of at least about 90° C. but not above about 100° C. for a time not less than about that given by the expression $T=28-.2t$, where T is the time in hours and $t$ is the temperature in degrees centigrade, and circulating said drilling fluid in said well.

15. In the drilling of a well wherein there is circulated in said well a drilling fluid comprising in admixture water and clay, the method of reducing the loss of water from the drilling fluid into the earth formations through the drilling fluid sheath formed on the walls of said well comprising adding to said drilling fluid in an amount between about 0.1 pound and 4 pounds per barrel of said drilling fluid karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade, and circulating said drilling fluid in said well.

16. In the drilling of a well wherein there is circulated in said well a drilling fluid comprising in admixture water, clay, and calcium compound in an amount in excess of that required to provide calcium ions to combine with the anion of the clay, the method of reducing the loss of water from the drilling fluid into the earth formations through the drilling fluid sheath formed on the walls of said well comprising adding to said drilling fluid in an amount between about 0.1 pound and 4 pounds per barrel of said drilling fluid karaya gum which has been previously heated in the dry state at a temperature of at least about 90° C. but not above about 100° C. and for a time not less than about that given by the expression $T=28-.2t$, where T is the time in hours and $t$ is the temperature in degrees centigrade, and circulating said drilling fluid in said well.

THOMAS E. WATKINS.

References Cited in the file of this patent

UNITED STATES PATENTS

| Number | Name | Date |
| --- | --- | --- |
| 2,189,949 | Griffith et al. | Feb. 13, 1940 |
| 2,337,296 | Kennedy | Dec. 21, 1943 |
| 2,551,768 | Sherborne | May 8, 1951 |